(12) United States Patent
Choi et al.

(10) Patent No.: US 9,670,419 B2
(45) Date of Patent: Jun. 6, 2017

(54) PROCESS FOR HEAVY OIL UPGRADING IN A DOUBLE-WALL REACTOR

(71) Applicant: Saudi Arabian Oil Company, Dhahran (SA)

(72) Inventors: Ki-Hyouk Choi, Dhahran (SA); Joo-Hyeong Lee, Ras Tanura (SA); Abdullah T. Alabdulhadi, Dhahran (SA)

(73) Assignee: SAUDI ARABIAN OIL COMPANY (SA)

( * ) Notice: Subject to any disclaimer, the term of this patent is extended or adjusted under 35 U.S.C. 154(b) by 0 days.

(21) Appl. No.: 15/397,116

(22) Filed: Jan. 3, 2017

(65) Prior Publication Data
US 2017/0114286 A1    Apr. 27, 2017

Related U.S. Application Data

(62) Division of application No. 14/554,209, filed on Nov. 26, 2014, now Pat. No. 9,567,530.

(51) Int. Cl.
  *B01J 19/24*    (2006.01)
  *C10G 9/40*    (2006.01)
(52) U.S. Cl.
  CPC ............ *C10G 9/40* (2013.01); *B01J 19/2415* (2013.01); *B01J 2219/00094* (2013.01);
  (Continued)
(58) Field of Classification Search
  CPC ...... B01D 2253/102; B01D 2257/7025; B01D 2259/4525; B01J 19/2415; B01J 20/20;
  (Continued)

(56) References Cited

U.S. PATENT DOCUMENTS

| 4,818,371 A | 4/1989 | Bain et al. |
| 4,840,725 A | 6/1989 | Paspek |

(Continued)

FOREIGN PATENT DOCUMENTS

| FR | 3001156 A1 | 7/2014 |
| WO | 2014032669 A1 | 3/2014 |
| WO | 2014032671 A1 | 3/2014 |

OTHER PUBLICATIONS

Calzavara et al., "A new reactor concept for hydrothermal oxidation", Journal of Supercritical Fluids, 2004, pp. 195-206, vol. 31, Elsevier.

(Continued)

*Primary Examiner* — Sharon Pregler
(74) *Attorney, Agent, or Firm* — Bracewell LLP; Constance Gall Rhebergen

(57) ABSTRACT

A process for reducing coke formation during hydrocarbon upgrading reactions using a double-wall reactor comprising the steps of feeding a heated feed water to a shell-side volume of the double-wall reactor to produce a heat transfer stream, the double-wall reactor comprising an exterior wall and an interior wall, a reaction section volume, a heating element configured to heat the heat transfer stream, wherein heat is transferred from the heat transfer stream to the reaction section volume, feeding the hot water return exiting the shell-side volume through a filter; mixing the filtered water stream with a heated hydrocarbon feedstock; feeding the mixed stream to the reaction section volume in a configuration counter-current to the heat transfer stream; reacting the reaction flow stream at a reaction temperature, wherein the heat transferred to the reaction section volume is operable to maintain the reaction temperature above the critical temperature of water.

10 Claims, 7 Drawing Sheets

(52) U.S. Cl.
CPC ............... *B01J 2219/00105* (2013.01); *B01J 2219/00135* (2013.01); *B01J 2219/00157* (2013.01); *B01J 2219/24* (2013.01); *C10G 2300/708* (2013.01)

(58) Field of Classification Search
CPC ............ B01J 20/28045; B01J 20/28066; B01J 20/28073; B01J 20/28076; B01J 20/3057; B01J 20/3078; B01J 20/3204; B01J 20/3214; B01J 2219/00094; B01J 2219/00105; B01J 2219/0011; B01J 2219/00135; B01J 2219/00157; B01J 2219/00159; B01J 3/008; C10G 1/002; C10G 1/065; C10G 2300/202; C10G 2300/206; C10G 2300/708; C10G 31/08; C10G 45/26; C10G 49/18; C10G 55/04; C10G 9/40; G05D 1/027; G05D 1/0274; G05D 1/0278; G05D 2201/0201
See application file for complete search history.

(56) References Cited

U.S. PATENT DOCUMENTS

| | | |
|---|---|---|
| 4,900,429 A | 2/1990 | Richardson |
| 5,008,085 A | 4/1991 | Bain et al. |
| 5,356,530 A | 10/1994 | Calderon |
| 5,358,646 A | 10/1994 | Gloyna et al. |
| 5,554,347 A | 9/1996 | Busson et al. |
| 6,312,652 B1 | 11/2001 | Duncan |
| 6,485,631 B1 | 11/2002 | Ellingsen |
| 6,749,816 B1 | 6/2004 | Hasegawa et al. |
| 7,255,372 B2 | 8/2007 | Bertholin et al. |
| 7,591,983 B2 | 9/2009 | Takahashi et al. |
| 8,196,658 B2 | 6/2012 | Miller et al. |
| 8,197,670 B2 | 6/2012 | Li et al. |
| 8,349,268 B2 | 1/2013 | Yeung |
| 8,636,323 B2 | 1/2014 | Prince-Wright et al. |
| 2004/0232046 A1 | 11/2004 | Tanaka et al. |
| 2008/0099378 A1 | 5/2008 | He et al. |
| 2009/0206007 A1 | 8/2009 | Allam |
| 2010/0189610 A1 | 7/2010 | Allam |
| 2012/0061291 A1 | 3/2012 | Choi et al. |
| 2012/0149944 A1 | 6/2012 | Zmierczak et al. |
| 2014/0099691 A1 | 4/2014 | Iversen |
| 2014/0109465 A1 | 4/2014 | Coppola et al. |

OTHER PUBLICATIONS

International Search Report and Written Opinion for related PCT application PCT/US2015/061536 dated Apr. 6, 2016.

Vilcaez et al., "Hydrothermal extractive upgrading of bitumen without coke formation", Fuel, 2012, pp. 379-385, vol. 102, Elsevier.

PROCESS FOR HEAVY OIL UPGRADING IN A DOUBLE-WALL REACTOR

CROSS REFERENCE TO RELATED APPLICATIONS

This application is a divisional of and claims priority from U.S. Non-Provisional application Ser. No. 14/554,209 filed on Nov. 26, 2014. For purposes of United States patent practice, this application incorporates the contents of the Non-provisional Application by reference in its entirety.

TECHNICAL FIELD

This invention relates to a method and apparatus for reducing coke formation during upgrading of heavy oil. More specifically, the present invention relates to a method and apparatus for upgrading heavy oil in a double-wall reactor using supercritical water to reduce the formation of coke.

BACKGROUND

Increasing demand for gasoline and diesel requires more petroleum products of light and middle range distillates which can be mixed into gasoline and diesel pools. However, currently available hydrocarbon resources, most commonly include crude oil and other heavy fractions and heavy fraction distillates, requiring refining processes to generate desired products.

Conventional refining processes upgrade heavy oil into light and middle distillate range products with the aid of thermal energy, catalysts, and hydrogen. Representative conventional processes include catalytic hydroprocesses and coking processes. Catalytic hydroprocessing, such as hydrocracking, produces clean gasoline and diesel products, where impurities, such as sulfur, are minimized, but the premium quality of the products requires a huge consumption of hydrogen to produce. Coking processes, where catalysts and hydrogen are not employed, utilize thermal cracking reactions to upgrade heavy oil into gases, light distillates, and middle distillates, but also produce large amounts of low economic byproducts, such as solid coke.

A third option to upgrade heavy oil is the use of supercritical water. A low dielectric constant makes supercritical water a good solvent for organic compounds. Supercritical water has been used as a reaction medium for certain chemical reactions such as oxidation and for upgrading hydrocarbons. Supercritical water is a good reaction medium for upgrading because hydrogen can be transferred from the water to the hydrocarbons. Thus, a huge supply of hydrogen gas is not necessary. Supercritical water acts as a diluent, diluting the hydrocarbons. In upgrading heavy oil using supercritical water, as in thermal cracking, a radical is generated due to chemical bonds breaking. Molecular rearrangement follows radical propagation, including cracking, dimerization, and oligomerization. However, unlike in thermal cracking alone, upgrading reactions in supercritical water reduce the chance for radicals to be oligomerized, because the supercritical water acts as a "cage" to restrict the radicals. Radical species are stabilized by supercritical water through the cage effect (i.e., a condition whereby one or more water molecules surrounds the radical species, which then prevents the radical species from interacting). Stabilization of radical species is believed to help to prevent inter-radical condensation and thus, reduce the overall coke production in the current invention. For example, coke production can be the result of the inter-radical condensation.

Coke, or petroleum coke, is a solid material formed in upgrading reactions. The solid material may leave the reactor with the liquid products, but commonly remains as a layer on the inner surfaces of the reactor and process piping. To be useful, coke requires further processing and is therefore considered a less valuable by-product to upgraded hydrocarbons.

Coking is a significant problem in upgrading reactions. Coking increases at increased temperatures. While the extent to which coking will occur is hard to predict, it is known that temperatures above 400° C. are enough to form coke. One reason coking is accelerated at higher temperatures is because radical formation is accelerated at higher temperatures. More radicals results in more oligomerization reactions, which increases the molecular condensation reactions or coke formation.

Hot spots contribute to coking in upgrading reactors. Hot spots occur due to localized heating of a metal surface, such as a reactor wall. In general, localized heating is caused by an irregular or non-uniform distribution of a direct heat source, such as a flame, an electric heater, a formation of an insulator on a metal surface, or an irregular fluid distribution on a metal surface. An example of an irregular fluid distribution on a metal surface would be the stoppage of process fluid flow in a tubular reactor. Thus, a furnace or heater must be designed for uniform distribution of temperature through the reactor walls. One design feature is to coat the surfaces of reactors with heat transfer materials to provide better heat distribution, but such heat transfer materials often have short life spans and are expensive to replace. A second design option is to ensure a high superficial velocity of the process fluid through the reactor. A high superficial velocity can improve temperature distribution. However, in some cases designing for high superficial velocity requires a high length to diameter ratio of the reactor tube which increases the cost of the reactor due to the material weight of the reactor tube. Any design should feature sensitive instrumentation for temperature monitoring throughout the reactor to prevent formation of hot spots. However, even with precise design and instrumentation, hot spots in a direct heating system are inevitable. At best, a reactor design can hope to minimize the number and intensity of hot spots.

Hot spots contribute to coking because they cause localized excessive heating of the fluid in the reactor. The excessive heating causes localized coke formation on the inner wall of the reactor. Once the coke forms on the inner wall both the size and intensity of the hot spot can increase leading to more coke formation. Additionally, the coke formation hinders accurate measurement of temperature in the reactor.

Coke formation during upgrading processes limits the functionality of the upgrading process. A reduction in the coke formed during upgrading would lead to an increased yield of liquid hydrocarbon products. Coke formation limits the run length, or residence time, the petroleum can spend in the reactor. Shorter residence times results in less efficient upgrading. Coke plugs the process lines causing an increase in the pressure of the process lines and the reactor. If the pressure increases above a certain point, the entire process must be shut down so the coke can be removed. Otherwise the pressure build-up could cause mechanical failure of the plant equipment. Coke formation is one of the common causes for unscheduled shut-downs of refining processes.

Supercritical water reduces coke formation compared to a purely thermal process. The extent of coking prevention by supercritical water, however, depends on the type of heavy oil. Even supercritical water is limited in preventing coke formation because molecules, especially, heavy molecules, are not easily dissolved in supercritical water due to their low solubility, so the larger molecules, such as asphaltenes, can be easily converted to coke through radical mediated reactions. Additionally, supercritical water at higher temperatures has lower density than heavy oil and that density changes more quickly as the temperature rises at supercritical pressures. At 25 MPa, the density of water at 400° C. is 166.54 kg/m$^3$ while at 450° C. the density is 108.98 kg/m$^3$. The relative difference in the density of heavy oil and supercritical water causes settling of heavy molecules on the reactor bottom or walls, where such segregated heavy molecules act as a precursor for coke formation. Even in supercritical water reactor, the aggregation of heavy molecules can lead to the formation of coke, and coke can lead to the formation of hot spots.

A supercritical water process that reduces or prevents the formation of hot spots would be advantageous. A supercritical water process that reduces the formation of coke and increases operational stability over conventional supercritical water processes would be advantageous.

SUMMARY

The current invention provides a process and apparatus for the upgrading of a hydrocarbon feedstock with supercritical water, wherein the upgrading process specifically excludes the use of a hydrothermal catalyst or the use of an external supply of hydrogen.

In a first aspect of the present invention, a process for reducing coke formation during hydrocarbon upgrading reactions using a double-wall reactor is provided. The process includes the steps of feeding a heated feed water to a shell-side volume of the double-wall reactor to produce a heat transfer stream. The double-wall reactor includes an exterior wall and an interior wall, the exterior wall and the interior wall defining the shell-side volume disposed between, a reaction section volume bounded by the interior wall, a heating element, the heating element adjacent to the exterior wall, wherein the heating element is configured to heat the heat transfer stream to create a hot water return, such that the heat transfer stream is above the critical temperature of water, wherein heat is transferred from the heat transfer stream through the interior wall to the reaction section volume, wherein the hot water return exits the shell-side volume, wherein the heat transfer stream is at a temperature greater than the critical temperature of water and is at a pressure greater than the critical pressure of water. The process further includes the steps of feeding the hot water return exiting the shell-side volume of the double-wall reactor through a filter, the filter is configured to remove particulates to form a filtered water stream, mixing the filtered water stream with a heated hydrocarbon feedstock in a mixer to produce a mixed stream, wherein the heated hydrocarbon feedstock is at a pressure greater than the critical pressure of water and at a temperature greater than 50° C., feeding the mixed stream to the reaction section volume of the double-wall reactor in a flow configuration counter-current to the heat transfer stream to create a reaction flow stream, reacting the reaction flow stream at a reaction temperature in the reaction section volume to produce a reactor effluent, wherein the heat transferred to the reaction section volume from the heat transfer stream is operable to maintain the reaction temperature above the critical temperature of water, cooling the reactor effluent in a reactor cooler to produce a cooled effluent, de-pressurizing the cooled effluent in a pressure reducer to produce a depressurized effluent, separating the depressurized effluent in a phase separator to produce a gas phase product and a liquid phase product, and separating the liquid phase product in a product separator to produce a separated water stream and an upgraded hydrocarbon stream.

In certain aspects of the present invention, the process further includes the step of recycling the separated water stream to combine with a feed water upstream of the double-wall reactor. In certain aspects of the present invention, the double-wall reactor further includes a shell-side inlet, the shell-side inlet configured to receive the heated feed water, a shell-side outlet, the shell-side outlet configured to eject the heat transfer stream as the hot water return, a reaction inlet, the reaction inlet configured to receive the mixed stream, and a reaction outlet, the reaction outlet configured to eject the reaction flow stream as the reactor effluent, wherein the shell-side inlet, the shell-side outlet, the reaction inlet, and the reaction outlet are configured to create the flow configuration counter-current between the heat transfer stream and the reaction flow stream. In certain aspects of the present invention, the double-wall reactor further includes baffles extending from the exterior wall into the shell-side volume, the baffles configured to increase heat transfer from the heating element and the exterior wall to the heat transfer stream. In certain aspects of the present invention, the process further includes the step of feeding the hot water return to a mixer pre-heater, the mixer pre-heater configured to increase the temperature of the hot water return to produce a hot mixer feed, and feeding the hot mixer feed to the filter to produce the filtered water stream. In certain aspects of the present invention, the process further includes the step of feeding the heated feed water to a water super heater, the water super heater configured to increase the temperature of the heated feed water to produce a hot water supply, and feeding the hot water supply to the shell-side volume of the double-wall reactor. In certain aspects of the present invention, the process further includes the steps of feeding the reactor effluent to a supercritical water reactor, the supercritical water reactor configured to upgrade hydrocarbons present in the reactor effluent, wherein the temperature of the supercritical water reactor is greater than the critical temperature of water, wherein the pressure of the supercritical water reactor is greater than the critical pressure of water, reacting the reactor effluent to produce a product stream, and feeding the product stream to the reactor cooler. In certain aspects of the present invention, liquid yield is greater than 98% by volume. In certain aspects of the present invention, the upgraded hydrocarbon stream has reduced amounts of asphaltene, sulfur, and other impurities. In certain aspects of the present invention, a residence time of the reaction flow stream in the double-wall reactor is greater than 10 seconds.

In a second aspect of the present invention, a supercritical water plant to upgrade hydrocarbons with reduced coke formation is provided. The supercritical water plant includes a hydrocarbon feedstock pump, the hydrocarbon feedstock pump configured to pressurize a hydrocarbon feedstock to a pressure above the critical pressure of water to produce a pressurized hydrocarbon feedstock, a hydrocarbon feedstock heater fluidly connected to the hydrocarbon feedstock pump, the hydrocarbon feedstock heater configured to heat the pressurized hydrocarbon feedstock to a temperature greater than 50° C. to produce a heated hydrocarbon feedstock, a feed water pump, the feed water pump configured to pressurize a feed water to a pressure above the critical pressure of water to produce a pressurized feed water, a feed water heater fluidly connected to the feed water pump, the feed water pump configured to heat the pressurized feed water to a temperature above the critical temperature of water to produce a heated feed water, a double-wall reactor, the double-wall reactor configured to upgrade the hydrocarbons with upgrading reactions, the double-wall reactor further configured to limit coke formation during the upgrading reactions. The double-wall reactor includes a shell-side inlet fluidly connected to the feed water heater, the shell-side inlet configured to receive the heated feed water to produce a heat transfer stream in a shell-side volume, an exterior wall and an interior wall, the exterior wall and the interior wall defining the shell-side volume disposed between, the shell-side volume configured to receive the heat transfer stream, a reaction section volume bounded by the interior wall, a shell-side outlet fluidly connected to the shell-side volume, the shell-side outlet configured to eject the heat transfer stream to produce a hot water return, and a heating element, the heating element adjacent to the exterior wall, wherein the heating element is configured to heat the heat transfer stream, such that the heat transfer stream is above the critical temperature of water, wherein heat is transferred from the heat transfer stream through the interior wall to the reaction section volume. The supercritical water plant further includes a filter fluidly connected to the shell-side outlet, the filter configured to remove particulates from the hot water return to form a filtered water stream, a mixer fluidly connected to the filter, the mixer configured to mix the filtered water stream and the heated hydrocarbon feedstock to produce a mixed stream, wherein the mixed stream is supplied to the reaction section volume of the double-wall reactor in a flow configuration counter-current to the heat transfer stream to produce a reaction flow stream, wherein the reaction section volume is operable to upgrade the hydrocarbons in the reaction flow stream to produce a reactor effluent, a reactor cooler fluidly connected to the double-wall reactor, the reactor cooler configured to cool the reactor effluent to a temperature below the critical temperature of water to produce a cooled effluent, a pressure reducer fluidly connected to the reactor cooler, the pressure reducer configured to reduce the pressure of the cooled effluent to a pressure below the critical pressure of water to produce a depressurized effluent, a phase separator fluidly connected to the pressure reducer, the phase separator configured to separate the depressurized effluent into a gas phase product and a liquid phase product, and a product separator fluidly connected to the phase separator, the product separator configured to separate the liquid phase product into an upgraded hydrocarbon stream and a separated water stream.

In certain aspects of the present invention, the separated water stream is combined with the feed water upstream of the feed water pump. In certain aspects of the present invention, the double-wall reactor further includes a reaction inlet, the reaction inlet configured to receive the mixed stream, and a reaction outlet, the reaction outlet configured to eject the reaction flow stream as the reactor effluent, wherein the shell-side inlet, the shell-side outlet, the reaction inlet, and the reaction outlet are configured to create the flow configuration counter-current between the heat transfer stream and the reaction flow stream. In certain aspects of the present invention, the double-wall reactor further includes baffles extending from the exterior wall into the shell-side volume, the baffles configured to increase heat transfer from the heating element and the exterior wall to the heat transfer stream. In certain aspects of the present invention, the supercritical water plant further includes a mixer pre-heater fluidly connected to the double-wall reactor, the mixer pre-heater configured to increase the temperature of the hot water return to produce a hot mixer feed, wherein the hot mixer feed is supplied to the filter to produce the filtered water stream. In certain aspects of the present invention, the supercritical water plant further includes a water super heater fluidly connected to the feed water heater, the water super heater configured to increase the temperature of the heated feed water to produce a hot water supply, wherein the hot water supply is supplied to the shell-side volume of the double-wall reactor. In certain aspects of the present invention, the supercritical water plant further includes a supercritical water reactor fluidly connected to the double-wall reactor, the supercritical water reactor configured to upgrade unreacted hydrocarbons present in the reactor effluent to produce a product stream, wherein the temperature of the supercritical water reactor is greater than the critical temperature of water, wherein the pressure of the supercritical water reactor is greater than the critical pressure of water, wherein the product stream is supplied to the reactor cooler. In certain aspects of the present invention, liquid yield is greater than 98% by volume. In certain aspects of the present invention, the upgraded hydrocarbon stream has reduced amounts of asphaltene, sulfur, and other impurities. In certain aspects of the present invention, a residence time of the reaction flow stream in the double-wall reactor is greater than 10 seconds.

BRIEF DESCRIPTION OF THE DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

Although the following detailed description contains many specific details for purposes of illustration, it is understood that one of ordinary skill in the art will appreciate that many examples, variations and alterations to the following details are within the scope and spirit of the invention. Accordingly, the exemplary embodiments of the invention described herein and provided in the appended figures are set forth without any loss of generality, and without imposing limitations, relating to the claimed invention. Features of the embodiments can be combined with features of other embodiments.

Figure 1:
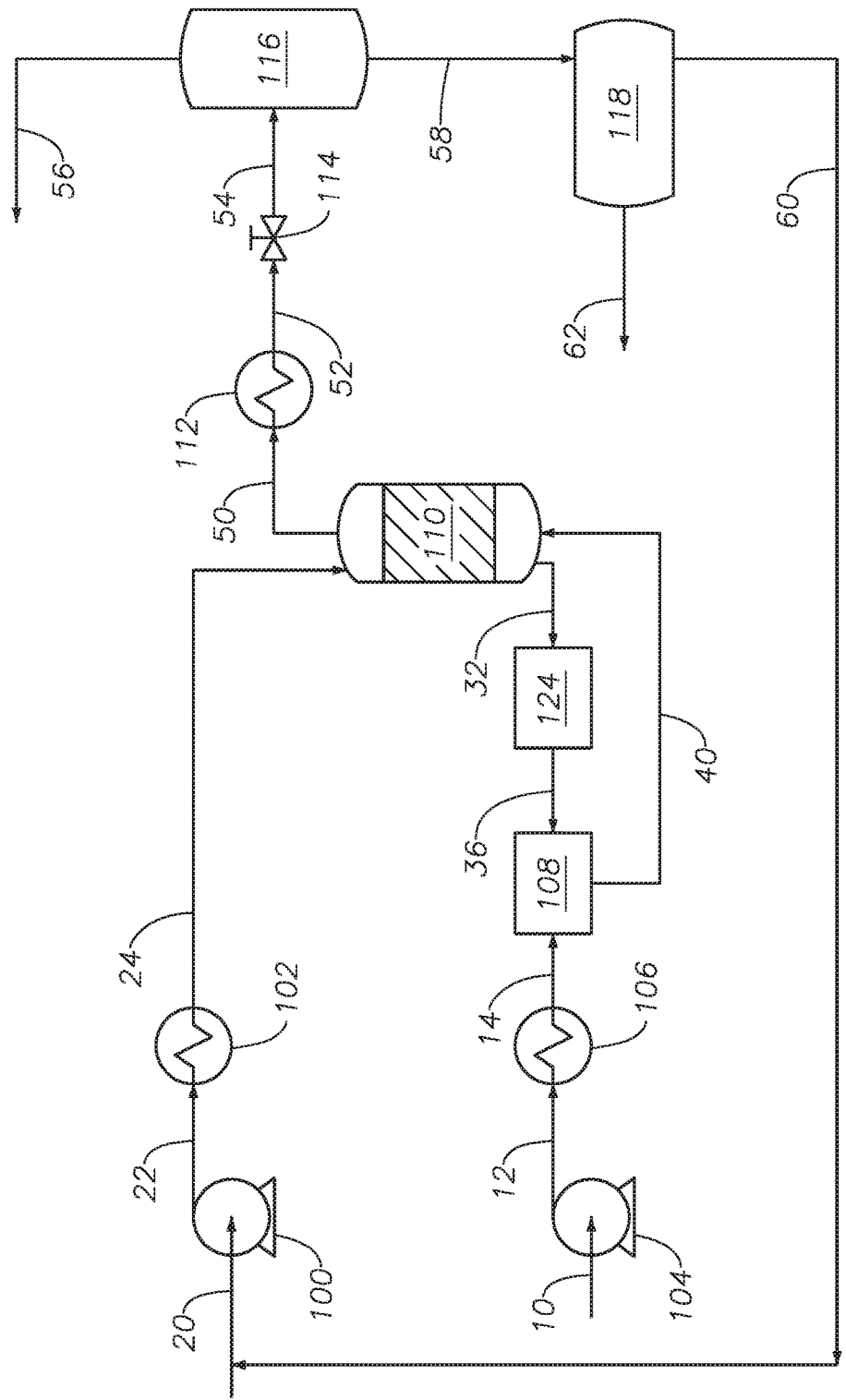
FIG. 1 provides a process diagram of one embodiment of the method of upgrading a hydrocarbon feedstock according to the present invention.

Referring to FIG. 1, an embodiment of a process for reducing coke formation in a double-wall reactor is provided. Hydrocarbon feedstock 10 is pressurized in hydrocarbon feedstock pump 104 to create pressurized hydrocarbon feedstock 12. Hydrocarbon feedstock 10 can be from any hydrocarbon source. Exemplary hydrocarbon sources for use as hydrocarbon feedstock 10 include whole range crude oil, distilled crude oil, residue oil, vacuum residue oil, topped crude oil, bottom fraction of crude oil, product streams from oil refineries, vacuum gas oil, product streams from steam cracking processes, liquefied coals, liquid products recovered from oil or tar sands, bitumen, oil shale, asphaltene, biomass hydrocarbons, and the like. The pressure of pressurized hydrocarbon feedstock 12 is greater than about 22.064 MPa and alternately between about 22.1 MPa and about 31.9 MPa. In at least one embodiment of the present invention, the pressure of pressurized hydrocarbon feedstock 12 is 25.0 MPa. The critical pressure of water is 22.064 MPa.

Pressurized hydrocarbon feedstock 12 is heated in hydrocarbon feedstock heater 106 to form heated hydrocarbon feedstock 14. The temperature of heated hydrocarbon feedstock 14 is between about 10° C. and about 300° C., alternately between about 50° C. and 250° C., alternately between about 50° C. and 200° C., alternately between about 50° C. and 150° C., alternately between about 50° C. and about 100° C., alternately between about 100° C. and about 200° C., alternately between about 150° C. and about 250° C., alternately between about 200° C. and about 300° C. In at least one embodiment of the present invention, the temperature of heated hydrocarbon feedstock 14 is greater than 50° C. In at least one embodiment of the present invention, the temperature of heated hydrocarbon feedstock 14 is 125° C. Hydrocarbon feedstock heater 106 can be any heat transfer unit capable of heating pressurized hydrocarbon feedstock 12. Exemplary heat transfer units that can be employed as hydrocarbon feedstock heater 106 include natural gas fired heater, heat exchanger, and electric heater. In some embodiments, pressurized hydrocarbon feedstock 12 is heated in a cross-exchange operation in a heat exchanger with another process stream. In at least one embodiment of the present invention, hydrocarbon feedstock heater 106 is designed to minimize pressure drop such that the pressure of heated hydrocarbon feedstock 14 exiting hydrocarbon feedstock heater 106 is above the critical pressure of water. Heated hydrocarbon feedstock 14 is fed to mixer 108.

Feed water 20 can be any source of water. In at least one embodiment, feed water 20 has a conductivity less than about 10.0 μmhos/cm. Conductivity is the most common way to determine the concentration of ionic compounds in the water. A higher conductivity indicates an increased presence of ionic compounds in the water. Ionic compounds such as sodium chloride can precipitate under supercritical water conditions, even though dissolved in water at subcritical conditions. Exemplary sources of water that can be utilized as feed water 20 include demineralized water, distillated water, boiler feed water, deionized water, and treated, recycled water. In at least one embodiment of the present invention, feed water 20 is a demineralized water. In at least one embodiment of the present invention, feed water 20 is in the absence of brine. In at least one embodiment of the present invention, feed water 20 includes water recycled from separated water stream 60. Feed water 20 is pressurized in feed water pump 100 to produce pressurized feed water 22. The pressure of pressurized feed water 22 is greater than about 22.064 MPa, alternately between about 22.1 MPa and about 31.9 MPa, alternately between about 22.9 MPa and about 31.1 MPa. In at least one embodiment of the present invention, the pressure of pressurized feed water 22 is 25.0 MPa. The critical pressure of water is 22.064 MPa.

Pressurized feed water 22 is heated in feed water heater 102 to create heated feed water 24. The temperature of heated feed water 24 is greater than about 374° C., alternately between about 374° C. and about 600° C., alternately between 400° C. and about 550° C., alternately between about 400° C. and about 450° C., alternately between 450° C. and about 500° C., alternately between about 500° C. and about 550° C., alternately between about 550° C. and about 600° C. The maximum temperature of the water is selected in consideration of the materials of construction of the double-wall reactor 110 and the associated piping back to feed water heater 102. In at least one embodiment of the present invention, the temperature of heated feed water 24 is 520° C. The critical temperature of water is 373.946° C. Feed water heater 102 can be any type of heat transfer unit capable of heating pressurized feed water 22. Exemplary heat transfer units to employ as feed water heater 102 include a natural gas fired heater, a heat exchanger, an electric heater, or any heater or heat exchanger known in the art. In some embodiments of the present invention, pressurized feed water 22 is partially heated in a cross-exchange operation in a heat exchanger with another process stream of the process. Heated feed water 24 is supercritical water, above the critical temperature and the critical pressure, or critical point of water. Above the critical temperature and pressure, the liquid and gas phase boundary of water disappears, and the fluid has characteristics of both liquid and gaseous substances. Supercritical water is able to dissolve organic compounds like an organic solvent and has excellent diffusibility like a gas. Regulation of the temperature and pressure allows for continuous "tuning" of the properties of the supercritical water to be more liquid or more gas like. Supercritical water has reduced density and lower polarity, as compared to liquid-phase sub-critical water, thereby greatly extending the possible range of chemistry which can be carried out in water. Supercritical water has various unexpected properties as it reaches supercritical boundaries. Supercritical water has very high solubility toward organic compounds and has an infinite miscibility with gases. In certain embodiments, supercritical water generates hydrogen gas through a steam reforming reaction and water-gas shift reaction, which is then available for the upgrading reactions.

Heated feed water 24 is fed to double-wall reactor 110. In at least one embodiment of the present invention, double-wall reactor 110 shares features with a double pipe heat exchanger. In at least one embodiment of the present invention, double-wall reactor 110 is designed to specification based on the process conditions, including flow rate. Double-wall reactor 110 is described with reference to FIG. 2. Double-wall reactor 110 has exterior wall 210 and interior wall 212. In at least one embodiment of the present invention, exterior wall 210 and interior wall 212 are formed of two concentric cylinders, open at both ends, the two concentric cylinders are not connected. In at least one embodiment of the present invention, double-wall reactor 110 is a double-pipe type vessel with an external heating source. The volume enclosed by interior wall 212 defines reaction section volume 214. The volume between interior wall 212 and exterior wall 210 defines shell-side volume 216. Reaction section volume 214 has one reaction inlet 230 and one reaction outlet 232. Shell-side volume 216 has shell-side inlet 220 and shell-side outlet 222. Heated feed water 24 enters shell-side volume 216 of double-wall reactor 110 through shell-side inlet 220 to create heat transfer stream 30.

The design of double-wall reactor 110 that restricts exchange of fluids directly between shell-side volume 216 and reaction section volume 214 reduces the risk of mechanical failure (at joints, nozzles, ports, etc.), simplifies fabrication of double-wall reactor 110, and provides for more manageable control of pressure and temperature. Temperature control in reaction section volume 214 and along interior wall 212 is an advantage of the present invention.

Heating element 218 is adjacent to exterior wall 210. Heating element 218 is any direct heating source. Exemplary direct heating sources for use as heating element 218 include an electric heater, a gas fired heater, a liquid fired heater, and a coal fired heater. Heating element 218 transfers heat to heat transfer stream 30. In at least one embodiment of the present invention, heating element 218 maintains the temperature of heat transfer stream 30 relative to the temperature of heated feed water 24. In at least one embodiment of the present invention, heating element 218 extends the entire length or substantially the entire length of exterior wall 210. In at least one embodiment of the present invention, heating element 218 extends for less than the entire length of exterior wall 210. In at least one embodiment of the present invention, heating element 218 wraps around the entire circumference of exterior wall 210. In at least one embodiment of the present invention, heating element 218 is adjacent to a portion of the circumference of exterior wall 210. In at least one embodiment of the present invention, heating element 218 increases the temperature of heat transfer stream 30 above the temperature of heated feed water 24. Heating of heat transfer stream 30 is in the absence of an oxidation reaction, which can contribute to run-away reaction temperatures. Heat is transferred from exterior wall 210 through heat transfer stream 30 in shell-side volume 216 to interior wall 212, through interior wall 212 to reaction section volume 214. The volume between interior wall 212 and exterior wall 210, the flow rate of heat transfer stream 30, and the temperature of heat transfer stream 30 are optimized in consideration of heat transfer requirements from exterior wall 210 through shell-side volume 216 to interior wall 212 and to improve the efficiency of heat transfer stream 30 as the heat transfer medium. The velocity of heat transfer stream 30 is influenced by the target reaction temperature.

In at least one embodiment of the present invention, the efficiency of heat transfer to heat transfer stream 30 can be improved by installing baffles 240 adjacent to exterior wall 210 and extending into shell-side volume 216. Baffles 240 increase the heat transfer ability of heating element 218 to heat transfer stream 30 by increasing the surface area exposed to the flow of heat transfer stream 30, creating a larger surface that interacts with heat transfer stream 30. Improved heating of heat transfer stream 30 improves the efficiency of heat transfer from heat transfer stream 30 to reaction section volume 214. In at least one embodiment of the present invention, baffles 240 are fins.

Double-wall reactor 110 is designed in consideration of optimizing the reactor parameters. Reactor parameters include residence time, reactor orientation, flow direction, reaction volume, reactor aspect ratio, and operating conditions. Residence time in double-wall reactor 110 is at least 5 seconds, alternately at least 10 seconds, alternately at least 15 seconds, alternately at least 20 seconds, alternately at least 30 seconds, and alternately at least 40 seconds. In at least one embodiment of the present invention, the residence time in double-wall reactor 110 is at least 10 seconds. Reactor orientation, as used herein, refers to how the reactor is aligned relative to ground. Exemplary reactor orientations include vertical and horizontal. In at least one embodiment of the present invention, double-wall reactor 110 has a vertical reactor orientation. Flow direction refers to whether the flow of mixed stream 40 is upflow or downflow in a vertical reactor orientation. In an upflow flow direction, reaction inlet 230 of double-wall reactor 110 is positioned nearer to grade relative to double-wall reactor 110 outlet and mixed stream 40 is fed to reaction inlet 230. In a downflow flow direction, reaction inlet 230 is positioned farther from grade relative to reaction outlet 232. Reaction volume refers to the total volume of reaction section volume 214. The reaction volume is calculated in consideration of desired residence time, heat transfer efficiency of heated feed water 24, and the reactor aspect ratio. Reactor aspect ratio is the ratio of the length to the diameter of double-wall reactor 110. The aspect ratio plays a role in heat transfer capability, the residence time, and the flow regime. The operating conditions include reactor temperature and reactor pressure. Reactor temperature is defined as the temperature of the fluid at the end of reaction section volume 214.

Referring again to FIG. 1, heat transfer stream 30 exits shell-side volume 216 of double-wall reactor 110 as hot water return 32. The temperature of hot water return 32 is within 10 degrees of the temperature of heated feed water 24, alternately within 20 degrees, alternately within 30 degrees, alternately within 40 degrees, and alternately within 50 degrees. In at least one embodiment of the present invention, the temperature of hot water return 32 is above the temperature of heated feed water 24. In at least one embodiment of the present invention, the temperature of hot water return 32 is below the temperature of heated feed water 24. Hot water return 32 becomes one of the reactants in reaction section volume 214.

Hot water return 32 flows through filter 124 to produce filtered water stream 36. Filter 124 can be any type of filtering element known in the art that can remove particulates, including char. In at least one embodiment of the present invention, filter 124 has a metal housing. In at least one embodiment of the present invention, filter 124 includes a plurality of filtering elements arranged in a parallel assembly. Filtered water stream 36 is fed to mixer 108 to produce mixed stream 40. In at least one embodiment of the present invention, hot water return 32 is in the absence of filter 124 and hot water return 32 mixes directly with heated hydrocarbon feedstock 14 in mixer 108.

Figure 2:
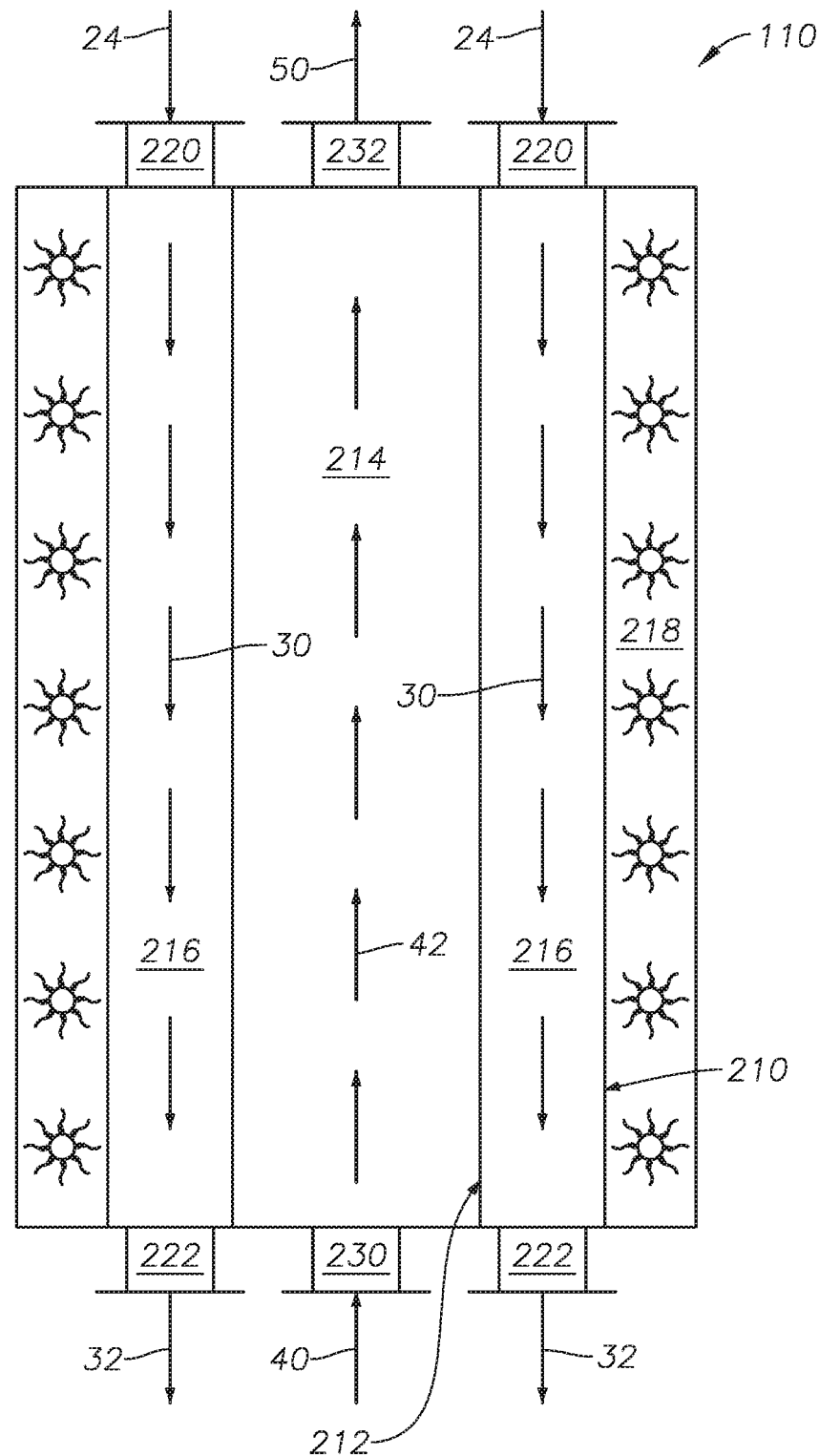
FIG. 2 provides a plan view of an embodiment of a double-wall reactor.
Figure 2A:
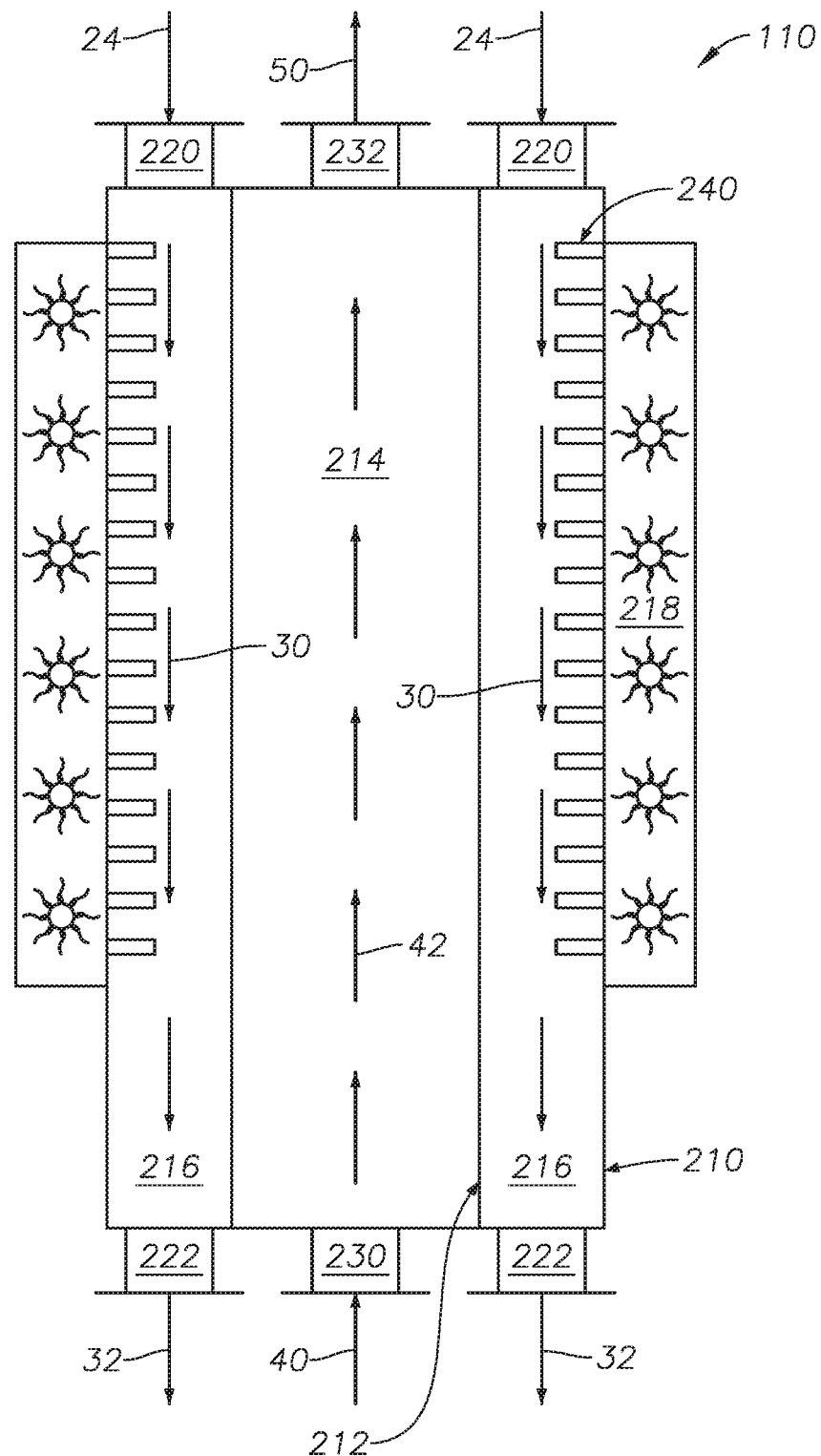
FIG. 2a provides a plan view of an embodiment of a double-wall reactor.

Filtered water stream 36 and heated hydrocarbon feedstock 14 are mixed externally from double-wall reactor 110. Double-wall reactor 110 is in the absence of features designed to enhance mixing of reactants. Mixing heated hydrocarbon feedstock 14 and filtered water stream 36 in double-wall reactor 110 reduces the ability to maintain control of temperature, pressure, and flow-rate in double-wall reactor 110 creating unstable conditions in double-wall reactor 110. Mixing heated hydrocarbon feedstock 14 and filtered water stream 36 upstream of double-wall reactor 110 (externally to double-wall reactor 110) ensures a more uniform temperature profile of mixed stream 40 when entering double-wall reactor 110 and as it moves through reaction section volume 214 as reaction flow stream 42, as shown in FIG. 2. Mixer 108 can be any type of mixing device capable of mixing filtered water stream 36 and heated hydrocarbon feedstock 14. In at least one embodiment of the present invention, mixer 108 is an inline mixer. Mixed stream 40 has a ratio of water to hydrocarbons represented by a ratio of the volumetric flow rate of feed water 20 ($v20$) to the volumetric flow rate of hydrocarbon feedstock 10 (υ10). The ratio of υ20 to υ10 is in the range from about 10:1 to about 1:10 as measured at standard ambient temperature and pressure, alternately about 5:1 to about 1:5 as measured at standard ambient temperature and pressure, alternately less than 4:1 as measured at standard ambient temperature and pressure, alternately less than 3:1 as measured at standard ambient temperature and pressure, and alternately less than 2:1 as measured at standard ambient temperature and pressure. In at least one embodiment of the present invention, the ratio of υ20 to υ10 is 1.4:1 as measured at standard ambient temperature and pressure. In at least one embodiment of the present invention, the ratio of υ20 to υ10 is 2.5:1 as measured at standard ambient temperature and pressure. Mixed stream 40 is fed to reaction section volume 214 of double-wall reactor 110. As used herein, "standard ambient temperature and pressure" refers to 25° C. and 0.1 MPa. Standard temperature and pressure refers to 0° C. and 0.1 MPa. Standard ambient temperature and pressure is more applicable.

Mixed stream 40 and heated feed water 24 are fed to double-wall reactor 110 in a counter-current flow configuration as illustrated in FIG. 2. A counter-current flow configuration as used herein refers to the flow direction of the streams and means that the streams in double-wall reactor 110 enter the vessel from opposite ends, such that the feed location of one stream is adjacent to the exit location of a second stream. The counter-current flow configuration maintains uniform or substantially uniform temperature distribution in reaction flow stream 42 throughout the length of reaction section volume 214. Reaction flow stream 42 receives heat through interior wall 212 via indirect heating from heat transfer stream 30 to maintain reaction flow stream 42 at the reaction temperature. Reaction flow stream 42 is continuous flow. Heat transfer stream 30 is continuous flow.

Double-wall reactor 110 is a supercritical reactor. Double-wall reactor 110 employs supercritical water as the reaction medium in reaction section volume 214 for hydrocarbon upgrading reactions in the absence of externally-provided hydrogen gas. Double-wall reactor 110 is in the absence of externally-provided oxidant. In at least one embodiment of the present invention, double-wall reactor 110 is in the absence of a catalyst. In at least one embodiment of the present invention, supercritical water acts as a diluent in double-wall reactor 110. The structure of double-wall reactor 110 reduces the formation of coke by providing indirect heating to reaction section volume 214. The absence of direct heating on interior wall 212 generates a uniform temperature distribution on interior wall 212. The uniform temperature distribution reduces or eliminates the formation of hot spots on interior wall 212. The reduction of hot spots reduces the formation of coke inside reaction section volume 214. Exothermic and endothermic reactions affect the ability to control reaction temperature due to localized heating or cooling associated with the exothermic or endothermic reactions, respectively. Without being bound to a particular theory, it is believed that hydrocarbon fluid reactors that have non-uniform distribution of components and/or temperatures, also have non-uniform local temperature due to the exothermic or endothermic reactions. Double-wall reactor 110, by producing a uniform temperature distribution, therefore reduces exothermic and/or endothermic reactions.

Reaction section volume 214 of double-wall reactor 110 produces reactor effluent 50. In at least one embodiment of the present invention, the temperature of reactor effluent 50 is less than the reactor temperature due to cooling through the piping at the end of double-wall reactor 110 (not shown). In at least one embodiment of the present invention, the temperature of reactor effluent 50 is greater than the temperature of mixed stream 40 due to the indirect heating in double-wall reactor 110. The reaction products in reactor effluent 50 are attributable to the composition of hydrocarbon feedstock 10, the ratio of υ20 to υ10, and the operating temperature of reaction section volume 214 of double-wall reactor 110.

Figure 5:
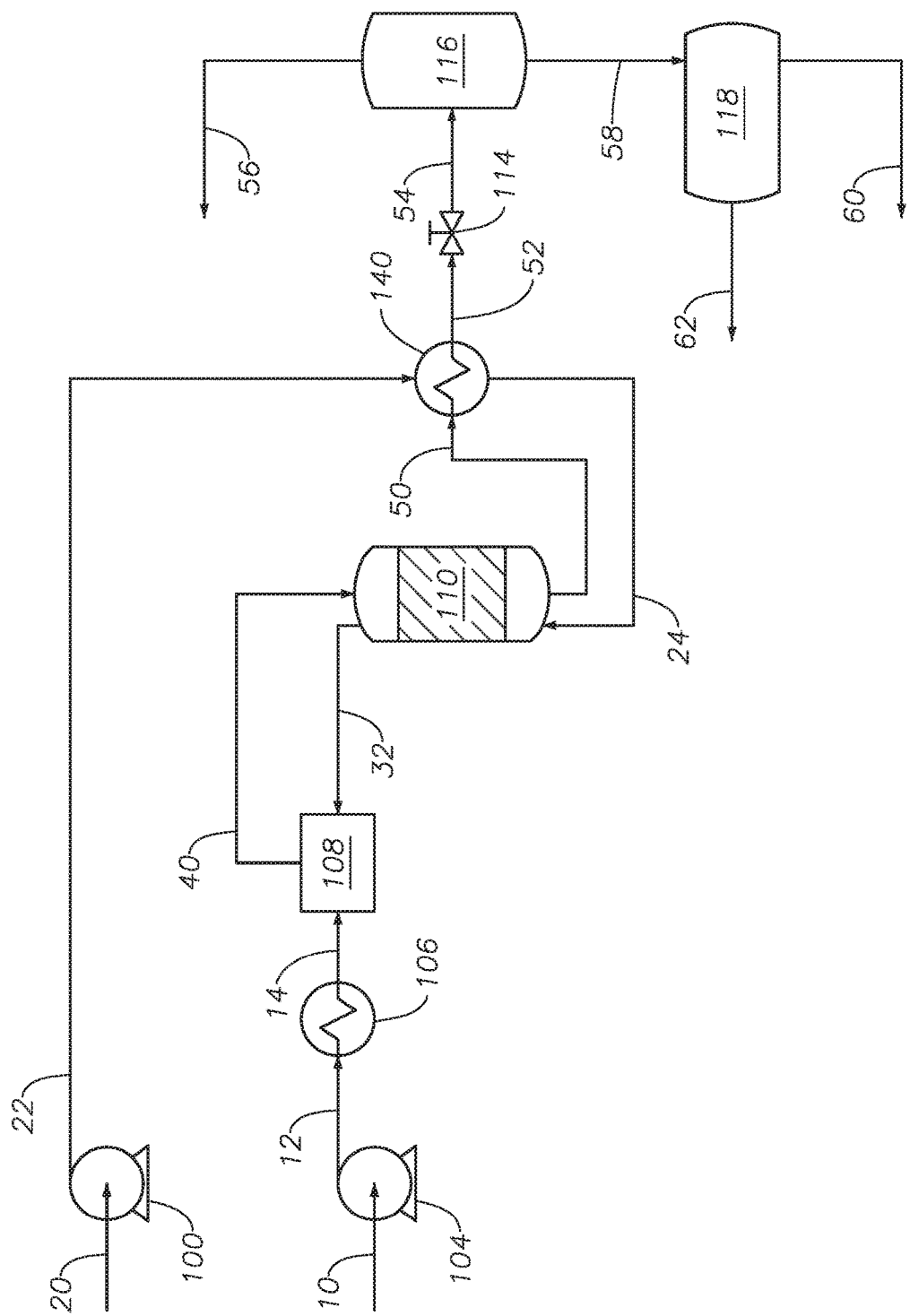
FIG. 5 provides a process diagram of one embodiment of the method of upgrading a hydrocarbon feedstock according to the present invention.

Reactor effluent 50 is cooled in reactor cooler 112 to create cooled effluent 52. Cooled effluent 52 has a temperature between about 10° C. and about 200° C., alternately between about 30° C. and about 120° C., alternately between about 50° C. and about 100° C. In at least one embodiment of the present invention, the temperature of cooled effluent 52 is 60° C. Reactor cooler 112 can be any heat transfer unit capable of cooling reactor effluent 50. Exemplary heat transfer units that can be employed as reactor cooler 112 include heat exchangers, steam generators, cross-exchangers, or air coolers. According to at least one embodiment of the present invention as shown in FIG. 5, reactor cooler 140 is a cross-exchanger that heats pressurized feed water 22 with heat from reactor effluent 50, and in the process cools reactor effluent 50. One of skill in the art will appreciate that cross-exchange heat exchangers can be utilized to provide energy recovery within the system.

The pressure of cooled effluent 52 is reduced in pressure reducer 114 to form depressurized effluent 54. The pressure of depressurized effluent 54 is between about 0.11 MPa and about 2.2 MPa, alternately between about 0.05 MPa and about 1.2 MPa, alternately between about 0.05 MPa and about 1.0 MPa, alternately between about 0.11 MPa and about 0.5 MPa. In at least one embodiment of the present invention, the pressure of depressurized effluent 54 is 0.11 MPa. In at least one embodiment of the present invention, the pressure of depressurized effluent 54 is atmospheric pressure (101.3 kPa). Pressure reducer 114 can be any type of depressurizing device capable of reducing the pressure of cooled effluent 52. Exemplary devices suitable for use as pressure reducer 114 include pressure control valve and capillary-type pressure let-down devices. Depressurized effluent 54 is fed to phase separator 116.

Reactor effluent 50, cooled effluent 52, and depressurized effluent 54 contain water, upgraded hydrocarbons, and other hydrocarbons. Depressurized effluent 54 further includes gases, such as carbon dioxide. Reactor effluent 50, cooled effluent 52, and depressurized effluent 54 have a higher content of light hydrocarbons as compared to hydrocarbon feedstock 10. The boiling point range of hydrocarbons in depressurized effluent 54 is lower compared to the boiling point range of hydrocarbons present in hydrocarbon feedstock 10. A lower boiling point range of hydrocarbons indicates a lower content of heavy fraction hydrocarbons. The mass fraction of water present in reactor effluent 50, cooled effluent 52, and depressurized effluent 54 depends on the operating conditions in double-wall reactor 110, the flow rate of feed water 20 and the feed ratio of water to hydrocarbon in mixed stream 40.

Phase separator 116 separates depressurized effluent 54 into gas phase product 56 and liquid phase product 58. Phase separator 116 is a gas-liquid separator. Exemplary separators for use as phase separator 116 include flash drum, flash column, multi-stage column, stripping-type column.

The operating conditions of reactor cooler 112, pressure reducer 114, and phase separator 116 are adjusted in consideration of the processing steps performed on gas phase product 56 and liquid phase product 58. The operating conditions of reactor cooler 112, pressure reducer 114, and phase separator 116 influence the total amount and the compositions in gas phase product 56 and liquid phase product 58.

Gas phase product 56 can be sent for further processing to recover components in the stream or alternately can be sent for processing and disposal. In at least one embodiment of the present invention, gas phase product 56 contains light hydrocarbon gases, including methane, ethane, ethylene, propane, and propylene. In at least one embodiment of the present invention, gas phase product 56 can be used as fuel gas. In at least one embodiment of the present invention, gas phase product 56 contains light hydrocarbon gases and hydrogen sulfide.

Liquid phase product 58 is fed to product separator 118 to separate liquid phase product 58 into upgraded hydrocarbon stream 62 and separated water stream 60. Upgraded hydrocarbon stream 62 contains reduced impurities compared to hydrocarbon feedstock 10. Upgraded hydrocarbon stream 62 can be sent for further processing, can be pooled with other upgraded hydrocarbons, or can be used in any other capacity appropriate for an upgraded hydrocarbon stream. The liquid yield of upgraded hydrocarbon stream 62 to hydrocarbon feedstock 10 was greater than 95%, alternately greater than 98%, alternately greater than 98.5%, and alternately greater than 99%. In at least one embodiment of the present invention, the liquid yield was greater than 98%. Liquid yield is a percentage of the total weight of upgraded hydrocarbon stream 62 divided by the total weight of hydrocarbon feedstock 10. Liquid yield will be less than 100% because of loss of gases and water, wherein hydrocarbons are dissolved in water. Separated water stream 60 can be sent for further processing, can be stored onsite, can be sent for disposal, or can be recycled to the front of the process. In at least one embodiment of the present invention, separated water stream 60 is recycled to be mixed with or to be used as feed water 20. Separated water stream 60 contains a total organic carbon content. The total organic carbon content is in the form of normal alkanes, aromatic compounds, and other hydrocarbons. Aromatic hydrocarbons have a higher solubility in supercritical water relative to normal alkanes. Removal of hydrocarbons from separated water stream 60 that is to recycled to the supercritical water process in double-wall reactor 110 is important to avoid the production of char due to hydrocarbon decomposition, which can plug the process lines. In at least one embodiment of the present invention, separated water stream 60 is treated to achieve a total organic carbon content of less than 20,000 ppm by weight, alternately less than 10,000 ppm by weight, alternately less than 5,000 ppm by weight, and alternately less than 1,000 by weight.

Process instrumentation and analyzers can be added to the system to improve the composition of upgraded hydrocarbon stream 62 by improving heating and pressure control of the process units.

Figure 3:
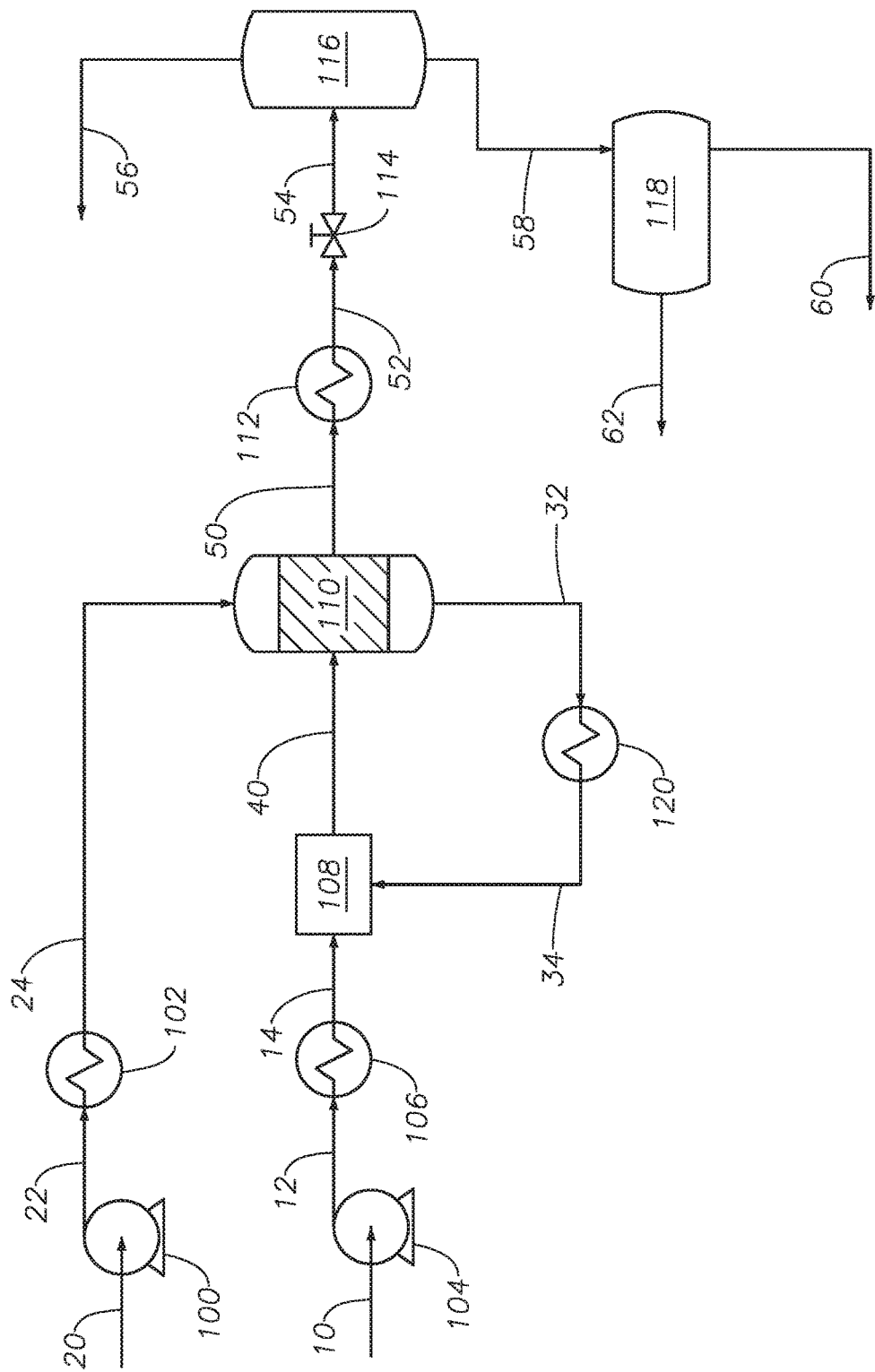
FIG. 3 provides a process diagram of one embodiment of the method of upgrading a hydrocarbon feedstock according to the present invention.

Referring to FIG. 3, an embodiment of the present invention is shown. According to the embodiment of the present invention as shown in FIG. 3 and with reference to FIG. 1 described herein, hot water return 32 exits shell-side volume 216 of double-wall reactor 110 and is fed to mixer pre-heater 120 to produce hot mixer feed 34. Mixer pre-heater 120 can be any type of heat transfer unit capable of heating hot water return 32. Exemplary heat transfer units for use as mixer pre-heater 120 include a natural gas fired heater, a heat exchanger, an electric heater, or any heater or heat exchanger known in the art. Hot mixer feed 34 is heated to a temperature above 374° C., alternately to a temperature above the temperature of hot water return 32 when it exits shell-side volume 216, and alternately to a temperature between the temperature of hot water return 32 when it exits shell-side volume 216 and 600° C. In at least one embodiment of the present invention, mixer pre-heater 120 increases the temperature of hot water return 32. Hot mixer feed 34 mixes with heated hydrocarbon feedstock 14 in mixer 108 to produce mixed stream 40.

Figure 4:
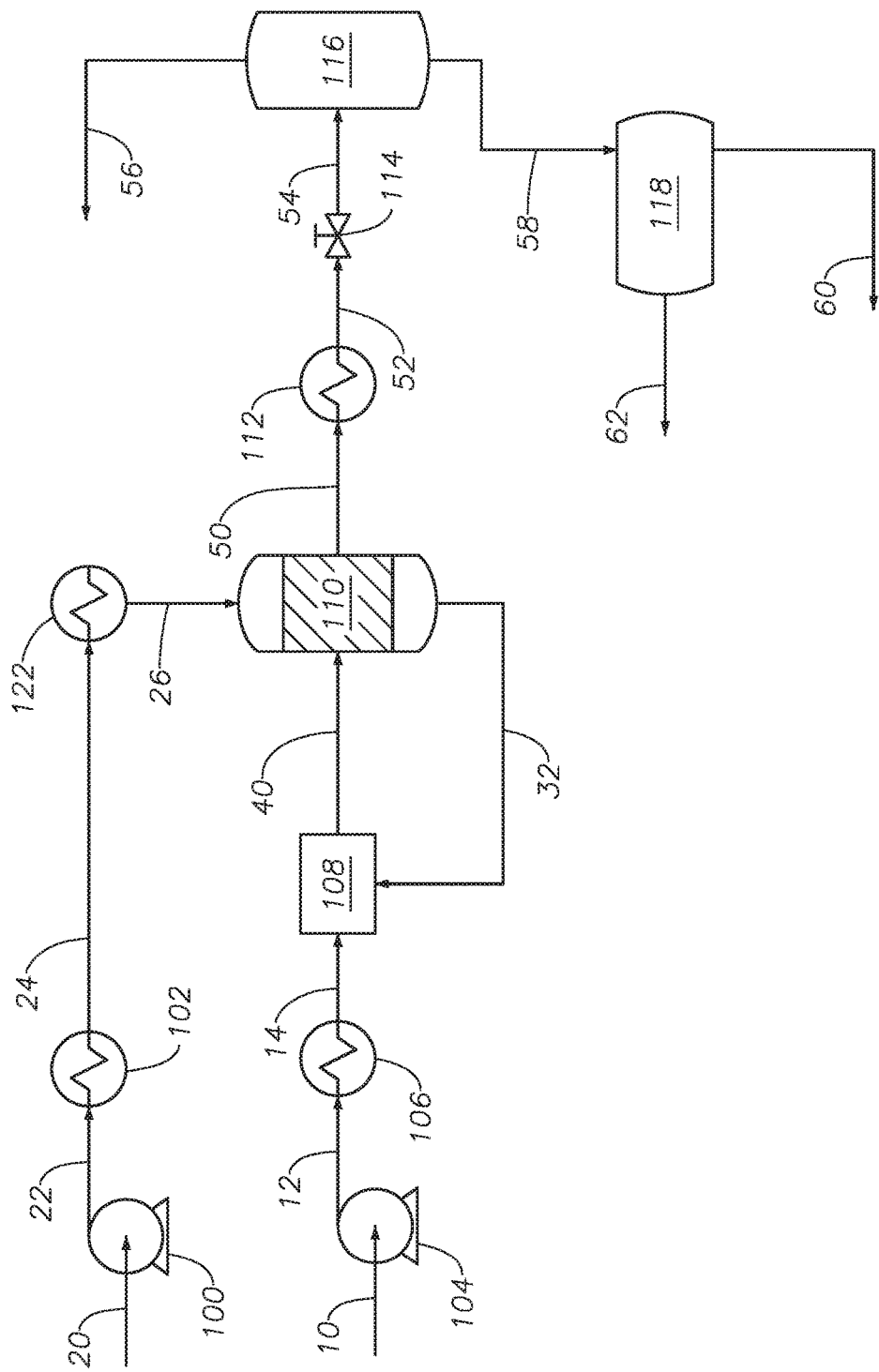
FIG. 4 provides a process diagram of one embodiment of the method of upgrading a hydrocarbon feedstock according to the present invention.

Referring to FIG. 4, an embodiment of the present invention is shown. According to the embodiment of the present invention as shown in FIG. 4 and with reference to FIG. 1 described herein, heated feed water 24 exits feed water heater 102 and is introduced to water super heater 122 to produce hot water supply 26. Water super heater 122 can be any type of heat transfer unit capable of heating heated feed water 24. Exemplary heat transfer units for use as water super heater 122 include a natural gas fired heater, a heat exchanger, an electric heater, or any heater or heat exchanger known in the art. Hot water supply 26 is heated to a temperature above 374° C., alternately to a temperature above the temperature of heated feed water 24 when it exits feed water heater 102, and alternately to the temperature between the temperature of heated feed water 24 when it exits feed water heater 102 and 600° C. In at least one embodiment of the present invention, water super heater 122, increases the temperature of heated feed water 24. Feed water heater 102 and water super heater 122 can be balanced for efficient heating to produce hot water supply 26. Hot water supply 26 is fed to shell-side volume 216 of double-wall reactor 110.

Figure 6:
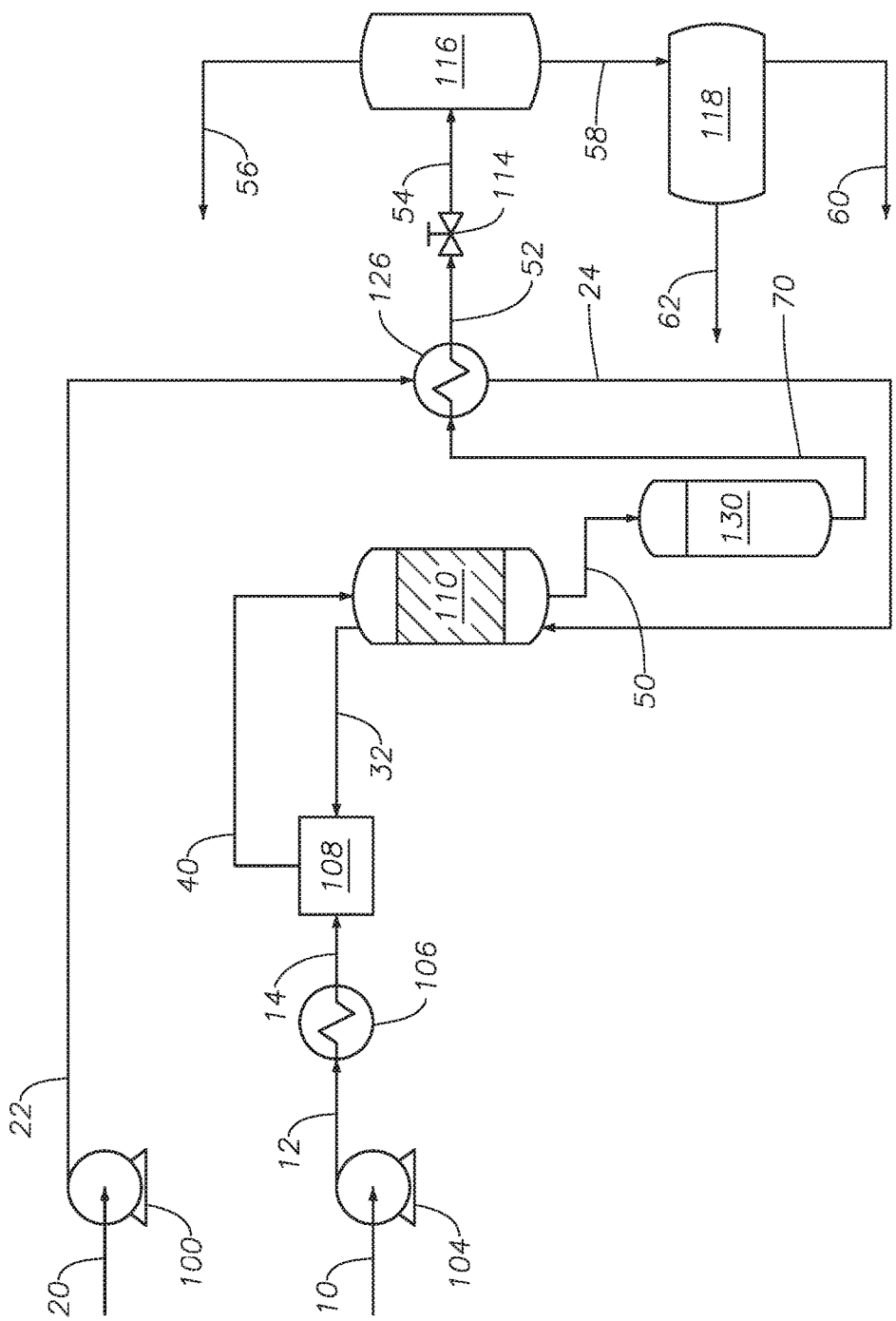
FIG. 6 provides a process diagram of one embodiment of the method of upgrading a hydrocarbon feedstock according to the present invention.

Referring to FIG. 6, an embodiment of the present invention is shown. According to the embodiment of the present invention as shown in FIG. 6 and with reference to FIG. 1 described herein, pressurized feed water 22 is heated in feed water cross-exchanger 126 by cross exchanging with product stream 70. Heating pressurized feed water 22 produces heated feed water 24 which is then fed to shell-side volume 216 of double-wall reactor 110 as described with reference to FIG. 1. Reactor effluent 50 is fed to supercritical water reactor 130 downstream of double-wall reactor 110.

Supercritical water reactor 130 is a supercritical reactor. Double-wall reactor 110 and supercritical water reactor 130 are in a two-reactor in series configuration. In a two-reactor in series configuration, the first reactor, double-wall reactor 110, ensures mixing of hydrocarbons and supercritical water and upgrading reactions begin to occur. In the second reactor, supercritical water reactor 130, the bulk of upgrading reactions occur, including cracking, desulfurization, and isomerization reactions. Ensuring the components are well-mixed in the first reactor eliminates all or substantially all of the hot spots in the second reactor. The elimination of hot spots prevents all or substantially all of the coke from forming in the second reactor. In at least one embodiment of the present invention, supercritical water reactor 130 is a single-wall reactor with a direct heating source. In at least one embodiment of the present invention, the second reactor is a double-wall reactor with a reaction section that is heated with indirect heating. In at least one embodiment of the present invention, the reactor parameters of double-wall reactor 110 and the reactor parameters of supercritical water reactor 130 are the same. In at least one embodiment of the present invention, the reactor parameters of double-wall reactor 110 and the reactor parameters of supercritical water reactor 130 are different. In at least one embodiment of the present invention, at least one of the reactor parameters of double-wall reactor 110 is the same as supercritical water reactor 130 and at least one of the reactor parameters of double-wall reactor 110 is different than supercritical water reactor 130. Supercritical water reactor 130 produces product stream 70. Product stream 70 is fed to feed water cross-exchanger 126. Product stream 70 is cooled in feed water cross-exchanger 126 to produce cooled effluent 52.

EXAMPLE

Comparative Example

Two simulations were created to compare a single-wall reactor and the double-wall reactor of the present invention.

In both simulations, a hydrocarbon feedstock at a rate of 10 barrels/day was pressurized to a pressure of 25.0 MPa and heated to a temperature of 125° C.

In the single-wall reactor simulation, the hydrocarbon feedstock was mixed with a feed water at a pressure of 25.0 MPa and a temperature of 460° C. The water stream was a water recycle stream from the liquid separator downstream of the reactor. The single-wall reactor was simulated as a tubular vessel having an internal volume of 10 L. The liquid yield was 95 wt %. Table 1 includes the operating conditions of the various streams. Table 2 shows the properties of the hydrocarbon feedstock and the upgraded hydrocarbon streams.

TABLE 1

Stream Operating Conditions

| Stream Name | Hydrocarbon Feedstock | Water Feed | Heated Hydrocarbon Feedstock | Heated Water | Mixed Stream | Reactor Effluent | Cooled Effluent | Depressurized Stream |
|---|---|---|---|---|---|---|---|---|
| Temp (° C.) | 25 | 25 | 125 | 460 | 365 | 450 | 50 | 45 |
| Pressure (MPa) | 0.11 | 0.11 | 25.0 | 25.0 | 25.0 | 24.8 | 24.6 | 0.11 |

TABLE 2

Stream Properties

| Properties | Hydrocarbon Feedstock | Upgraded Hydrocarbon Stream |
|---|---|---|
| Specific Gravity (API) | 17 | 24 |
| Asphaltene (wt %) | 13.0 | 2.0 |
| Sulfur (wt % S) | 3.2 | 2.6 |

In the double-wall reactor simulation, the embodiment was simulated as described with reference to FIG. 1. Feed water 20 was pressurized to a pressure of 25.0 MPa and heated to a temperature of 450° C. and then fed to shell-side volume 216 of double-wall reactor 110 as heated feed water 24. Hot water return 32 exiting double-wall reactor 110 was mixed with heated hydrocarbon feedstock 14 and fed to reaction section volume 214 of double-wall reactor 110 in a counter-current flow configuration to heated feed water 24. Feed water 20 was recycled from product separator 118 as at least a fraction of separated water stream 60. The temperature of hot water return 32 was 480° C. due to heating element 218 on exterior wall 210 of double-wall reactor 110. In the simulation, heating element 218 was simulated as an external gas fired heater. Liquid yield was 98 wt %. The operating conditions are in Table 3. The stream properties are in Table 4.

TABLE 3

Stream Operating Conditions

| Stream Name | Hydrocarbon Feedstock 10 | Feed Water 20 | Heated Hydrocarbon Feedstock 14 | Heated Feed Water 24 | Mixed Stream 40 | Reactor Effluent 50 | Cooled Effluent 52 | Depressurized Effluent 54 |
|---|---|---|---|---|---|---|---|---|
| Temp (° C.) | 25 | 25 | 125 | 450 | 373 | 430 | 50 | 50 |
| Pressure (MPa) | 0.11 | 0.11 | 25.0 | 25.0 | 25.0 | 25.0 | 24.8 | 0.11 |

TABLE 4

Stream Properties

| Properties | Hydrocarbon Feedstock | Upgraded Hydrocarbon Stream |
|---|---|---|
| Specific Gravity (API) | 17 | 25 |
| Asphaltene (wt %) | 13.0 | 1.8 |
| Sulfur (wt % S) | 3.2 | 2.5 |

Without being bound to any particular theory, it is believed that the absence of hot spots in the double-wall reactor as compared to the single-wall reactor resulted in the higher liquid yield, 98 wt % for the double-wall reactor vs. 95 wt % for the single-wall reactor, and better quality product, lower asphaltene weight percent and sulfur weight percent, even at lower reactor temperature, 430° C. for the double-wall reactor vs. 450° C. for the single-wall reactor. It is suspected that hot spots in the single-wall reactor simulation induced condensation reactions between heavy molecules, which caused coke formation, as well as over-cracking to produce gas phase product. Condensation reaction traps sulfur and metals in the heavier molecules that are products of condensation reactions.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value.

When such a range is expressed, it is to be understood that another embodiment is from the one particular value and/or to the other particular value, along with all combinations within said range.

That which is claimed is:

1. A supercritical water plant to upgrade hydrocarbons with reduced coke formation, the supercritical water plant comprising:
   a hydrocarbon feedstock pump, the hydrocarbon feedstock pump configured to pressurize a hydrocarbon feedstock to a pressure above the critical pressure of water to produce a pressurized hydrocarbon feedstock;
   a hydrocarbon feedstock heater fluidly connected to the hydrocarbon feedstock pump, the hydrocarbon feedstock heater configured to heat the pressurized hydrocarbon feedstock to a temperature greater than 50° C. to produce a heated hydrocarbon feedstock;
   a feed water pump, the feed water pump configured to pressurize a feed water to a pressure above the critical pressure of water to produce a pressurized feed water;
   a feed water heater fluidly connected to the feed water pump, the feed water pump configured to heat the pressurized feed water to a temperature above the critical temperature of water to produce a heated feed water;
   a double-wall reactor, the double-wall reactor configured to upgrade the hydrocarbons with upgrading reactions, the double-wall reactor further configured to limit coke formation during the upgrading reactions, the double-wall reactor comprising:
   a shell-side inlet fluidly connected to the feed water heater, the shell-side inlet configured to receive the heated feed water to produce a heat transfer stream in a shell-side volume;
   an exterior wall and an interior wall, the exterior wall and the interior wall defining the shell-side volume disposed between, the shell-side volume configured to receive the heat transfer stream;
   a reaction section volume bounded by the interior wall;
   a shell-side outlet fluidly connected to the shell-side volume, the shell-side outlet configured to eject the heat transfer stream to produce a hot water return; and
   a heating element, the heating element adjacent to the exterior wall, wherein the heating element is configured to heat the heat transfer stream, such that the heat transfer stream is above the critical temperature of water, wherein heat is transferred from the heat transfer stream through the interior wall to the reaction section volume;
   a filter fluidly connected to the shell-side outlet, the filter configured to remove particulates from the hot water return to form a filtered water stream;
   a mixer fluidly connected to the filter, the mixer configured to mix the filtered water stream and the heated hydrocarbon feedstock to produce a mixed stream, wherein the mixed stream is supplied to the reaction section volume of the double-wall reactor in a flow configuration counter-current to the heat transfer stream to produce a reaction flow stream, wherein the reaction section volume is operable to upgrade the hydrocarbons in the reaction flow stream to produce a reactor effluent;
   a reactor cooler fluidly connected to the double-wall reactor, the reactor cooler configured to cool the reactor effluent to a temperature below the critical temperature of water to produce a cooled effluent;
   a pressure reducer fluidly connected to the reactor cooler, the pressure reducer configured to reduce the pressure of the cooled effluent to a pressure below the critical pressure of water to produce a depressurized effluent;
   a phase separator fluidly connected to the pressure reducer, the phase separator configured to separate the depressurized effluent into a gas phase product and a liquid phase product; and
   a product separator fluidly connected to the phase separator, the product separator configured to separate the liquid phase product into an upgraded hydrocarbon stream and a separated water stream.

2. The supercritical water plant of claim 1, wherein the separated water stream is combined with the feed water upstream of the feed water pump.

3. The supercritical water plant of claim 1, wherein the double-wall reactor further comprises:
   a reaction inlet, the reaction inlet configured to receive the mixed stream; and
   a reaction outlet, the reaction outlet configured to eject the reaction flow stream as the reactor effluent,
   wherein the shell-side inlet, the shell-side outlet, the reaction inlet, and the reaction outlet are configured to create the flow configuration counter-current between the heat transfer stream and the reaction flow stream.

4. The supercritical water plant of claim 1, wherein the double-wall reactor further comprises:
   baffles extending from the exterior wall into the shell-side volume, the baffles configured to increase heat transfer from the heating element and the exterior wall to the heat transfer stream.

5. The supercritical water plant of claim 1, further comprising:
   a mixer pre-heater fluidly connected to the double-wall reactor, the mixer pre-heater configured to increase the temperature of the hot water return to produce a hot mixer feed, wherein the hot mixer feed is supplied to the filter to produce the filtered water stream.

6. The supercritical water plant of claim 1, further comprising:
   a water super heater fluidly connected to the feed water heater, the water super heater configured to increase the temperature of the heated feed water to produce a hot water supply, wherein the hot water supply is supplied to the shell-side volume of the double-wall reactor.

7. The supercritical water plant of claim 1, further comprising:
   a supercritical water reactor fluidly connected to the double-wall reactor, the supercritical water reactor configured to upgrade unreacted hydrocarbons present in the reactor effluent to produce a product stream, wherein the temperature of the supercritical water reactor is greater than the critical temperature of water, wherein the pressure of the supercritical water reactor is greater than the critical pressure of water, wherein the product stream is supplied to the reactor cooler.

8. The supercritical water plant of claim 1, wherein a liquid yield of the upgraded hydrocarbon is greater than 98% by volume.

9. The supercritical water plant of claim 1, wherein the upgraded hydrocarbon stream has reduced amounts of asphaltene, sulfur, and other impurities relative to the hydrocarbon feedstock.

10. The supercritical water plant of claim 1, wherein a residence time of the reaction flow stream in the double-wall reactor is greater than 10 seconds.

\* \* \* \* \*